US011892081B2

(12) United States Patent
Inoue et al.

(10) Patent No.: US 11,892,081 B2
(45) Date of Patent: Feb. 6, 2024

(54) SLIDING COMPONENT

(71) Applicant: Eagle Industry Co., Ltd., Tokyo (JP)

(72) Inventors: Hiroki Inoue, Tokyo (JP); Yuta Negishi, Tokyo (JP); Minori Onuma, Tokyo (JP); Iwa Ou, Tokyo (JP); Tadatsugu Imura, Tokyo (JP); Hiroshi Suzuki, Tokyo (JP)

(73) Assignee: EAGLE INDUSTRY CO., LTD.

( * ) Notice: Subject to any disclaimer, the term of this patent is extended or adjusted under 35 U.S.C. 154(b) by 0 days.

(21) Appl. No.: 17/628,158

(22) PCT Filed: Jul. 10, 2020

(86) PCT No.: PCT/JP2020/027005
§ 371 (c)(1),
(2) Date: Jan. 18, 2022

(87) PCT Pub. No.: WO2021/020074
PCT Pub. Date: Feb. 4, 2021

(65) Prior Publication Data
US 2022/0275828 A1    Sep. 1, 2022

(30) Foreign Application Priority Data

Jul. 26, 2019    (JP) .................................. 2019-137952

(51) Int. Cl.
*F16J 15/34* (2006.01)
*F16C 17/02* (2006.01)

(52) U.S. Cl.
CPC ......... *F16J 15/342* (2013.01); *F16J 15/3416* (2013.01); *F16J 15/3424* (2013.01); *F16C 17/026* (2013.01)

(58) Field of Classification Search
CPC .... F16J 15/3412; F16J 15/3416; F16J 15/342; F16J 15/3424; F16C 33/107; F16C 17/026
See application file for complete search history.

(56) References Cited

U.S. PATENT DOCUMENTS

| 3,085,808 | A | 4/1963 | Williams | 277/388 |
| 3,232,680 | A | 2/1966 | Clark | 384/110 |

(Continued)

FOREIGN PATENT DOCUMENTS

| CN | 1364987 | 8/2002 | F16J 15/40 |
| CN | 2534429 | 2/2003 | F16J 15/40 |

(Continued)

OTHER PUBLICATIONS

Chinese Office Action issued in application No. 201980065303.2 (with translation), dated Oct. 10, 2022 (13 pgs).

(Continued)

*Primary Examiner* — Nicholas L Foster
(74) *Attorney, Agent, or Firm* — HAYES SOLOWAY P.C.

(57) ABSTRACT

A sliding component having excellent lubricity and a high recovery rate of a sealed fluid is provided. In a mechanical seal as a sliding component in which a plurality of spiral grooves serving as a plurality of dynamic pressure generation grooves extending from a low pressure side to a high pressure side are formed on a sliding surface of a stationary seal ring serving as any one sliding member in the mechanical seal, the sliding surface is provided with an annular groove serving as a recessed portion extending in a circumferential direction and opened to the low pressure side and the annular groove communicates with the spiral groove.

4 Claims, 9 Drawing Sheets

(56) References Cited

U.S. PATENT DOCUMENTS

| | | | |
|---|---|---|---|
| 3,466,052 A | 4/1966 | Ludwig | |
| 3,410,565 A | 11/1968 | Williams | 277/348 |
| 3,499,653 A | 3/1970 | Gardner | 277/27 |
| 3,527,465 A | 9/1970 | Guinard | 277/400 |
| 3,656,227 A | 4/1972 | Weinand | 29/530 |
| 3,804,424 A | 4/1974 | Gardner | 277/27 |
| 3,855,624 A | 12/1974 | Reinhoudt | F16C 17/045 |
| 3,870,382 A | 3/1975 | Reinhoudt | F16C 17/045 |
| 4,406,466 A | 9/1983 | Geary, Jr. | 277/347 |
| 4,486,026 A | 12/1984 | Furumura et al. | 277/80 |
| 5,092,612 A | 3/1992 | Victor | 277/400 |
| 5,201,531 A | 4/1993 | Lai | F16J 15/3412 |
| 5,222,743 A | 6/1993 | Goldswain | 277/400 |
| 5,385,409 A * | 1/1995 | Ide | F16J 15/3432 |
| | | | 384/138 |
| 5,441,283 A | 8/1995 | Pecht et al. | 277/96.1 |
| 5,447,316 A | 9/1995 | Matsui | F16J 15/34 |
| 5,492,341 A | 2/1996 | Pecht | 277/400 |
| 5,496,047 A | 3/1996 | Goldswain | F16J 15/3412 |
| 5,498,007 A | 3/1996 | Kulkarni | 277/366 |
| 5,501,470 A | 3/1996 | Fuse | 277/400 |
| 5,529,318 A | 6/1996 | Fuse | F16J 15/3412 |
| 5,556,111 A | 9/1996 | Sedy | 277/96.1 |
| 5,605,339 A | 2/1997 | Pecht | F16J 15/3412 |
| 5,664,787 A | 9/1997 | Fuse et al. | F16J 15/34 |
| 5,702,110 A | 12/1997 | Sedy | |
| 5,895,051 A | 4/1999 | Bowers | B62D 5/22 |
| 6,142,478 A | 11/2000 | Pecht | F16J 15/3484 |
| 6,189,896 B1 | 2/2001 | Dickey et al. | F16L 17/06 |
| 6,446,976 B1 | 9/2002 | Key | 277/367 |
| 6,575,470 B1 * | 6/2003 | Gacek | F16J 15/3412 |
| | | | 277/408 |
| 6,817,766 B2 | 11/2004 | Gomyo | F16C 32/06 |
| 7,510,330 B2 | 3/2009 | Obara | F16C 32/06 |
| 7,568,839 B2 | 8/2009 | Gotoh et al. | F16C 32/06 |
| 7,758,051 B2 | 7/2010 | Roberts-Haritonov et al. | |
| | | | F16J 15/34 |
| 7,780,399 B1 | 8/2010 | Garrison | F01D 25/183 |
| 8,162,322 B2 | 4/2012 | Flaherty | F16J 15/3412 |
| 9,062,775 B2 | 6/2015 | Short et al. | F16J 15/34 |
| 9,353,865 B2 | 5/2016 | Lattin | F16N 21/00 |
| 9,353,867 B2 | 5/2016 | Itadani | F16J 15/342 |
| 9,371,912 B2 | 6/2016 | Hosoe et al. | F16J 15/34 |
| 9,587,745 B2 | 3/2017 | Itadani et al. | F16J 15/3412 |
| 9,677,670 B2 | 6/2017 | Itadani et al. | F16J 15/34 |
| 9,829,109 B2 | 11/2017 | Itadani et al. | F16J 15/3412 |
| 9,845,886 B2 | 12/2017 | Itadani | F16C 17/045 |
| 9,951,873 B2 | 4/2018 | Inoue et al. | F16J 15/34 |
| 9,982,784 B2 | 5/2018 | Osada et al. | F16J 15/34 |
| 10,054,230 B2 * | 8/2018 | Katori | F16J 15/34 |
| 10,072,759 B2 | 9/2018 | Inoue et al. | F16J 15/34 |
| 10,113,648 B2 | 10/2018 | Inoue et al. | F16J 15/342 |
| 10,190,689 B2 * | 1/2019 | Yoshida | F16J 15/3412 |
| 10,337,620 B2 | 7/2019 | Tokunaga et al. | F16J 15/342 |
| 10,352,450 B2 | 7/2019 | Yamanaka et al. | F16J 15/3204 |
| 10,408,349 B2 * | 9/2019 | Miyazaki | F16J 15/3272 |
| 10,473,220 B2 | 11/2019 | Tokunaga et al. | F16J 15/34 |
| 10,487,944 B2 * | 11/2019 | Itadani | F16J 15/3496 |
| 10,487,948 B2 | 11/2019 | Inoue et al. | F16J 15/342 |
| 10,495,228 B2 | 12/2019 | Itadani et al. | F16J 15/34 |
| 10,648,569 B2 | 5/2020 | Itadani | F16K 15/34 |
| 10,655,736 B2 | 5/2020 | Itadani | F16J 15/3416 |
| 10,704,417 B2 | 7/2020 | Tokunaga et al. | F01D 25/16 |
| 10,781,924 B2 | 9/2020 | Inoue et al. | F16J 15/342 |
| 10,883,603 B2 | 1/2021 | Inoue et al. | F16J 15/342 |
| 10,883,604 B2 | 1/2021 | Inoue et al. | F16J 15/342 |
| 11,009,072 B2 | 5/2021 | Kimura et al. | F16J 15/34 |
| 11,009,130 B2 | 5/2021 | Itadani | F16J 15/3284 |
| 11,125,335 B2 | 9/2021 | Kimura et al. | F16J 15/34 |
| 11,221,071 B2 * | 1/2022 | Sasaki | F16C 17/04 |
| 11,525,512 B2 * | 12/2022 | Kimura | F16J 15/3412 |
| 11,530,749 B2 * | 12/2022 | Kimura | F16J 15/441 |
| 11,603,934 B2 | 3/2023 | Imura | F16J 15/3412 |
| 11,644,100 B2 * | 5/2023 | Kimura | F16J 15/324 |
| | | | 277/579 |
| 2002/0093141 A1 | 7/2002 | Wang | 277/358 |
| 2003/0178781 A1 | 9/2003 | Tejima | |
| 2004/0080112 A1 | 4/2004 | Tejima | 277/306 |
| 2005/0135714 A1 | 6/2005 | Rahman | F16C 17/107 |
| 2005/0141789 A1 | 6/2005 | Kita et al. | F16C 32/06 |
| 2005/0212217 A1 | 9/2005 | Tejima | 277/399 |
| 2006/0093245 A1 | 5/2006 | Han | G11B 19/2018 |
| 2007/0296156 A1 | 12/2007 | Yanagisawa et al. | F16J 15/34 |
| 2008/0100001 A1 | 5/2008 | Flaherty | 277/400 |
| 2008/0272552 A1 | 11/2008 | Zheng | 277/400 |
| 2010/0066027 A1 | 3/2010 | Vasagar | 277/350 |
| 2011/0101616 A1 | 5/2011 | Teshima | 277/358 |
| 2012/0018957 A1 | 1/2012 | Watanabe | 277/387 |
| 2013/0189294 A1 | 7/2013 | Koelle et al. | F16J 15/34 |
| 2013/0209011 A1 | 8/2013 | Tokunaga | F16C 32/0633 |
| 2014/0203517 A1 | 7/2014 | Ferris | F16K 15/3412 |
| 2015/0115537 A1 | 4/2015 | Tokunaga | F16J 15/34 |
| 2015/0123350 A1 | 5/2015 | Itadani | 277/400 |
| 2015/0184752 A1 | 7/2015 | Itadani | F16J 15/3412 |
| 2015/0226334 A1 | 8/2015 | Itadani | F16J 15/342 |
| 2015/0240950 A1 | 8/2015 | Takahashi | F16J 15/363 |
| 2015/0260292 A1 | 9/2015 | Inoue et al. | F16J 15/342 |
| 2015/0377297 A1 | 12/2015 | Tokunaga et al. | F16C 33/748 |
| 2015/0377360 A1 | 12/2015 | Itadani | F16J 15/3412 |
| 2016/0033045 A1 | 2/2016 | Itadani et al. | F16J 15/3412 |
| 2016/0097457 A1 | 4/2016 | Sun et al. | F16J 15/34 |
| 2016/0252182 A1 | 9/2016 | Itadani et al. | F16J 15/34 |
| 2017/0009889 A1 * | 1/2017 | Seki | F16J 15/3272 |
| 2017/0198814 A1 | 7/2017 | Colombo et al. | F16J 15/3412 |
| 2017/0234431 A1 | 8/2017 | Katori et al. | F16J 15/3412 |
| 2018/0051809 A1 * | 2/2018 | Yoshida | F16J 15/3412 |
| 2018/0058584 A1 * | 3/2018 | Miyazaki | F16J 15/164 |
| 2018/0073394 A1 | 3/2018 | Tokunaga et al. | F01D 25/183 |
| 2018/0128377 A1 | 5/2018 | Tokunaga et al. | F16J 15/342 |
| 2018/0128378 A1 | 5/2018 | Tokunaga et al. | F16J 15/342 |
| 2019/0178386 A1 | 6/2019 | Arai | F16J 15/3496 |
| 2019/0301522 A1 | 10/2019 | Negishi et al. | F16C 17/026 |
| 2019/0376558 A1 | 12/2019 | Kimura | F16C 33/743 |
| 2020/0182299 A1 | 6/2020 | Kimura | F16C 17/026 |
| 2021/0054935 A1 | 2/2021 | Kimura | F16J 15/3412 |
| 2021/0080006 A1 | 3/2021 | Sasaki | F16J 15/34 |
| 2021/0116029 A1 * | 4/2021 | Kimura | F16J 15/324 |
| 2021/0116030 A1 * | 4/2021 | Kimura | F16J 15/3412 |
| 2021/0116032 A1 * | 4/2021 | Kimura | F16J 15/188 |
| 2021/0164571 A1 * | 6/2021 | Kimura | F16J 15/3412 |
| 2022/0010835 A1 | 1/2022 | Inoue | F16C 17/045 |
| 2022/0099191 A1 * | 3/2022 | Suzuki | F16C 33/103 |
| 2022/0275828 A1 | 9/2022 | Inoue | F16J 15/3424 |

FOREIGN PATENT DOCUMENTS

| | | | |
|---|---|---|---|
| CN | 1401924 | 3/2003 | F16J 15/16 |
| CN | 101749431 | 6/2010 | F16J 15/34 |
| CN | 101776152 | 7/2010 | F16J 15/48 |
| CN | 201582390 | 9/2010 | F16J 15/16 |
| CN | 103267132 | 8/2013 | F16J 15/54 |
| CN | 103732958 | 4/2014 | F16J 15/34 |
| CN | 103791097 | 5/2014 | F16J 15/34 |
| CN | 104019237 | 9/2014 | F16J 15/16 |
| CN | 104165229 | 11/2014 | F16J 15/40 |
| CN | 105683632 | 6/2016 | F04D 29/10 |
| CN | 106439037 | 2/2017 | F16J 15/34 |
| CN | 206017723 | 3/2017 | F16J 15/16 |
| CN | 107166036 | 9/2017 | F16J 15/16 |
| CN | 107532724 | 1/2018 | F16J 15/34 |
| CN | 107676484 | 2/2018 | F16J 15/3232 |
| CN | 108506494 | 9/2018 | F16J 15/34 |
| DE | 36 19 489 | 12/1987 | F16J 15/34 |
| DE | 4407453 | 9/1995 | F16C 17/08 |
| EP | 0637706 | 8/1993 | F16J 15/34 |
| EP | 0896163 | 2/1999 | F16C 33/10 |
| EP | 2520835 | 11/2012 | F16J 15/34 |
| EP | 2626604 | 8/2013 | F16J 15/34 |
| EP | 2977655 | 1/2016 | F16J 15/34 |
| EP | 3091258 | 11/2016 | F16J 15/34 |
| EP | 3299686 | 3/2018 | F16J 15/34 |
| EP | 3514414 | 7/2019 | F16J 15/34 |
| EP | 3922872 | 12/2021 | F16J 15/34 |
| EP | 3926187 | 12/2021 | F16C 17/04 |

(56) References Cited

FOREIGN PATENT DOCUMENTS

| | | | | |
|---|---|---|---|---|
| EP | 3926188 | 12/2021 | ............... | F16C 17/04 |
| EP | 3943765 | 1/2022 | ............... | F16C 17/04 |
| GB | 1509482 | 5/1978 | ............... | F16C 33/10 |
| JP | 36-6305 | 4/1959 | | |
| JP | S49-33614 | 9/1974 | ............... | F16J 15/34 |
| JP | S54-77305 | 6/1979 | ............... | B06B 9/10 |
| JP | S55-177549 | 12/1980 | ............... | F16J 15/16 |
| JP | H4-96671 | 8/1982 | ............... | F16J 15/34 |
| JP | S57-146955 | 9/1982 | ............... | F16J 15/34 |
| JP | 58-109771 | 6/1983 | ............... | F16J 15/34 |
| JP | 58-137667 | 8/1983 | ............... | F16J 15/40 |
| JP | S59-58252 | 4/1984 | ............... | F16J 15/34 |
| JP | S60-107461 | 7/1985 | ............. | B63H 23/36 |
| JP | S62-37572 | 2/1987 | ............... | F16J 51/34 |
| JP | S63-33027 | 3/1988 | ............... | F16J 33/46 |
| JP | S63-190975 | 8/1988 | ............... | F16J 15/34 |
| JP | S61-82177 | 5/1989 | ............... | F16J 15/34 |
| JP | H1-133572 | 9/1989 | ............... | F16J 15/34 |
| JP | 2-236067 | 9/1990 | ............... | F16J 15/34 |
| JP | H3-14371 | 2/1991 | ............... | F16J 15/34 |
| JP | 3-35372 | 4/1991 | ............... | F16J 15/34 |
| JP | 3-41267 | 4/1991 | ............... | F16J 15/34 |
| JP | 3-41268 | 4/1991 | ............... | F16J 15/34 |
| JP | H0341268 U * | 4/1991 | | |
| JP | H04-73 | 1/1992 | ............... | F16J 15/34 |
| JP | H04-145267 | 5/1992 | ............... | F16J 15/34 |
| JP | H05-90048 | 12/1993 | ............... | F16J 15/34 |
| JP | H05-322050 | 12/1993 | ............... | F16J 15/34 |
| JP | H07-55016 | 3/1995 | ............... | F16J 15/34 |
| JP | H08-89489 | 4/1996 | ............... | A61B 5/05 |
| JP | H09-503276 | 3/1997 | ............... | F16J 15/34 |
| JP | H09-329247 | 12/1997 | ............... | F16J 15/34 |
| JP | H10-38093 | 2/1998 | ............... | F16J 15/34 |
| JP | H10-281299 | 10/1998 | ............... | F16J 15/34 |
| JP | 2000-179543 | 6/2000 | ............. | F16C 17/10 |
| JP | 2001-295833 | 10/2001 | ............. | F16C 17/04 |
| JP | 2001-317638 | 11/2001 | ............... | F16J 15/34 |
| JP | 2003-161322 | 6/2003 | ............. | F16C 33/10 |
| JP | 2003-343741 | 12/2003 | ............... | F16J 15/34 |
| JP | 2004-003578 | 1/2004 | ............... | F16J 15/34 |
| JP | 2005-188651 | 7/2005 | ............... | F16J 15/34 |
| JP | 2006-9828 | 1/2006 | ............... | F16J 17/02 |
| JP | 2006-022834 | 1/2006 | ............... | F16J 15/34 |
| JP | 2006-77899 | 3/2006 | ............... | F16J 15/34 |
| JP | 2008-144864 | 6/2008 | ............. | F16C 33/10 |
| JP | 2009-250378 | 10/2009 | ............... | F16J 15/34 |
| JP | 2010-133496 | 6/2010 | ............... | F16J 15/34 |
| JP | 2010-216587 | 9/2010 | ............... | F16J 15/34 |
| JP | 2011-185292 | 9/2011 | ............... | F16J 15/34 |
| JP | 2011196429 | 10/2011 | ............... | F16J 15/34 |
| JP | 2012-2295 | 1/2012 | ............... | F16J 15/34 |
| JP | 5271858 | 5/2013 | ............... | F16J 15/34 |
| JP | 2016-80090 | 5/2016 | ............... | F16J 15/34 |
| JP | 2017-141961 | 8/2017 | ............... | F16J 15/34 |
| JP | 6444492 | 12/2018 | ............... | F16J 15/34 |
| JP | 2019-15401 | 1/2019 | ............... | F16J 15/34 |
| JP | 201913446 | 1/2019 | ............. | A47J 27/00 |
| WO | WO 95/06832 | 3/1995 | ............... | F16J 15/34 |
| WO | WO 2012/046749 | 4/2012 | ............... | F16J 15/34 |
| WO | WO 2014/024742 | 2/2014 | ............... | F16J 15/34 |
| WO | WO 2014/050920 | 4/2014 | ............... | F16J 15/34 |
| WO | WO 2014/103630 | 7/2014 | ............... | F16J 15/34 |
| WO | WO 2014/112455 | 7/2014 | ............... | F16J 15/34 |
| WO | WO2014103631 | 7/2014 | ............... | F16J 15/34 |
| WO | WO 2014/148316 | 9/2014 | ............... | F16J 15/34 |
| WO | WO 2014/174725 | 10/2014 | ............... | F16J 15/34 |
| WO | WO 2016/009408 | 1/2016 | ............... | F16J 15/34 |
| WO | WO 2016/035860 | 3/2016 | ............... | F16J 15/34 |
| WO | WO 2016/167262 | 10/2016 | ............... | F16J 15/34 |
| WO | WO 2016/186019 | 11/2016 | ............... | F16J 15/34 |
| WO | WO2016203878 | 12/2016 | ............... | F16J 15/34 |
| WO | WO 2017/002774 | 1/2017 | ............... | F16J 15/34 |
| WO | WO 2018/034197 | 2/2018 | ............... | F16J 15/34 |
| WO | WO 2018/105505 | 6/2018 | ............... | F16J 15/34 |
| WO | WO2018139231 | 8/2018 | ............... | F16J 15/34 |
| WO | WO2018139232 | 8/2018 | ............. | F16C 33/10 |

OTHER PUBLICATIONS

European Official Action issued in related European Patent Application Serial No. 19914452.8, dated Oct. 5, 2022, 10 pages.
European Official Action issued in related European Patent Application Serial No. 20756664.7, dated Oct. 14, 2022, 8 pages.
European Official Action issued in related European Patent Application Serial No. 20759684.2, dated Oct. 17, 2022, 7 pages.
Korean Office Action issued in application No. 10-2021-7019130 (with translation), dated Oct. 22, 2022 (13 pgs).
Korean Office Action issued in application No. 10-2021-7007194 (with translation), dated Nov. 7, 2022 (14 pgs).
Korean Office Action issued in application No. 10-2021-7009776 (with translation), dated Dec. 12, 2022 (19 pgs).
Notice of Allowance issued in U.S. Appl. No. 17/257,260, dated Nov. 23, 2022, 9 pages.
European Official Action issued in related European Patent Application Serial No. 19850900.2, dated Mar. 31, 2022, 11 pages.
European Official Action issued in related European Patent Application Serial No. 19843273.4, dated Mar. 24, 2022, 9 pages.
Chinese Office Action issued in application No. 201980087670.2 (with translation), dated Jul. 1, 2022 (17 pgs).
Chinese Office Action issued in application No. 201980043720.7 (with translation), dated Jun. 6, 2022 (12 pgs).
Chinese Office Action issued in application No. 202080014381.2 (with translation), dated Aug. 11, 2022 (15 pgs).
Chinese Office Action issued in application No. 202080012994.2 (with translation), dated Aug. 29, 2022 (14 pgs).
European Official Action issued in related European Patent Application Serial No. 19869466.3, dated May 19, 2022, 9 pages.
European Official Action issued in related European Patent Application Serial No. 19876680.0, dated Jun. 3, 2022, 8 pages.
European Official Action issued in related European Patent Application Serial No. 19888532.9, dated Jul. 8, 2022, 7 pages.
European Official Action issued in related European Patent Application Serial No. 19899646.4, dated Aug. 12, 2022, 9 pages.
Korean Office Action issued in application No. 10-2020-7037305 (with translation), dated Jun. 24, 2022 (17 pgs).
Korean Office Action issued in application No. 10-2021-7002193 (with translation), dated Jul. 18, 2022 (13 pgs).
Office Action issued in U.S. Appl. No. 17/257,260, dated Jul. 6, 2022 (12 pgs).
Chinese Office Action issued in application No. 201980082245.4 (with translation), dated Aug. 3, 2023, 25 pages.
European Official Action issued in application No. 19876680.0, dated Aug. 24, 2023, 8 pages.
Korean Official Action issued in Korean Patent Application Serial No. 10-2022-7002564, dated Jun. 27, 2023, 11 pages with translation.
Korean Official Action issued in Korean Patent Application Serial No. 10-2021-7028347, dated Jun. 22, 2023, 11 pages with translation.
Korean Official Action issued in Korean Patent Application Serial No. 10-2021-7009776, dated Jun. 28, 2023, 8 pages with translation.
Official Action issued in related U.S. Appl. No. 17/420,660, dated Sep. 13, 2023, 10 pages.
Notice of Allowance issued in related U.S. Appl. No. 17/296,466, dated Jul. 24, 2023, 11 pages.
Notice of Allowance issued in related U.S. Appl. No. 17/259,336, dated Sep. 19, 2023, 8 pages.
JP36-3605, p. 1, right column lines 15-17, line 15 to p. 2 left column line 3, Figures 1-3, Search Report from Applicants related application PCT/JP2019/045728.
JPH01133572, Figure 1, Search Report from Applicants related application PCT/JP2014/080715.
JP3-14371, Entire text and drawings, Search Report from Applicants related application PCT/JP2019/032723.

(56) References Cited

OTHER PUBLICATIONS

JP3-35372, Entire text and drawings, Search Report from Applicants related application PCT/JP2018/027005.
Chinese Office Action issued in application No. 201980076998.4 (with translation), dated Jan. 18, 2023, 12 pages.
Chinese Office Action issued in application No. 201980059152.X (with translation), dated Oct. 10, 2022, 14 pages.
Chinese Office Action issued in application No. 201980059152.X (with translation), dated May 8, 2023, 11 pages.
Chinese Office Action issued in application No. 202080012994.2(with translation), dated Feb. 2, 2023, 13 pages.
Chinese Office Action issued in application No. 202080012994.2(with translation), dated Apr. 24, 2023, 12 pages.
Chinese Office Action issued in application No. 201980082245.4 (with translation), dated Feb. 16, 2023, 23 pages.
European Official Action issued in application No. 19869466.3, dated Mar. 16, 2023, 7 pages.
European Official Action issued in application No. 22212136.0, dated Mar. 15, 2023, 8 pages.
European Official Action issued in application No. 19850900.2, dated Mar. 28, 2023, 4 pages.
European Official Action issued in application No. 23155551.7, dated Feb. 28, 2023, 7 pages.
European Official Action issued in application No. 19888532.9, dated Mar. 7, 2023, 3 pages.
European Official Action issued in application No. 23158438.4, dated May 15, 2023, 11 pages.
European Search Report issued in application No. 20847261.3, dated Jul. 17, 2023, 8 pages.
Japanese Decision of Refusal issued in application No. 2021-502065, dated May 23, 2023, 8 pages.
Korean Official Action issued in Korean Patent Application Serial No. 10-2021-7002193, dated Jan. 11, 2023, 11 pages.
Korean Official Action issued in Korean Patent Application Serial No. 10-2021-7022185, dated Apr. 6, 2023, 12 pages.
Korean Official Action issued in Korean Patent Application Serial No. 10-2021-7016898, dated Feb. 16, 2023, 13 pages.
Korean Official Action issued in Korean Patent Application Serial No. 10-2021-7028879, dated Jun. 28, 2023, 10 pages.
Official Action issued in related U.S. Appl. No. 17/413,466, dated Apr. 12, 2023, 11 pages.
Official Action issued in related U.S. Appl. No. 17/296,466, dated Apr. 12, 2023, 9 pages.
Official Action issued in related U.S. Appl. No. 17/428,909, dated Apr. 21, 2023, 8 pages.
Official Action issued in related U.S. Appl. No. 17/428,909, dated Jul. 25, 2023, 8 pages.
Official Action issued in related U.S. Appl. No. 17/628,158, dated May 15, 2023, 14 pages.
Notice of Allowance issued in related U.S. Appl. No. 17/296,466, dated Jul. 24, 2023, 9 pages.
Definition of groove by Merriam Webster.
Chinese Office Action issued in application No. 201380070532.6 (with translation), dated Jan. 28, 2016 (13 pgs).
Chinese Office Action issued in application No. 201380070532.6 (with translation), dated Sep. 20, 2016 (12 pgs).
Second Office Action issued by the State Intellectual Property Office of China, dated Aug. 29, 2016, for Chinese counterpart application No. 201480002574.0, 8 pages.
First Notification of Reason for Refusal issued by the State Intellectual Property Office of China, dated Dec. 24, 2015, with a search report for Chinese counterpart application No. 201480002574.0, 11 pages.
Office Action issued in U.S. Appl. No. 14/431,733, dated Apr. 29, 2016 (22 pgs).
Office Action issued in U.S. Appl. No. 14/431,733, dated Aug. 18, 2017 (13 pgs).
Office Action issued in U.S. Appl. No. 14/431,733, dated Mar. 31, 2017 (14 pgs).
Office Action issued in U.S. Appl. No. 14/431,733, dated Oct. 6, 2016 (12 pgs).
Office Action issued in U.S. Appl. No. 15/419,989, dated Jan. 26, 2018 (20 pgs).
Office Action issued in U.S. Appl. No. 15/419,970, dated May 11, 2018 (17 pgs).
Office Action issued in U.S. Appl. No. 15/419,970, dated Jan. 23, 2018 (21 pgs).
Office Action issued in U.S. Appl. No. 15/842,862, dated Jun. 5, 2019 (37 pgs).
Office Action issued in U.S. Appl. No. 15/842,855, dated Mar. 12, 2020 (11 pgs).
Office Action issued in U.S. Appl. No. 15/842,855, dated Jun. 29, 2020, 16 pages.
Office Action issued in U.S. Appl. No. 15/842,858, dated Mar. 31, 2020 (10 pgs).
Office Action issued in U.S. Appl. No. 15/842,859, dated Apr. 8, 2020 (12 pgs).
Notice of Allowance issued in U.S. Appl. No. 15/419,970, dated Aug. 9, 2018 (16 pgs).
Notice of Allowance issued in U.S. Appl. No. 14/431,733, dated Feb. 23, 2018 (22 pgs).
Notice of Allowance issued in U.S. Appl. No. 15/419,989, dated Jul. 23, 2018 (11 pgs).
Notice of Allowance issued in U.S. Appl. No. 15/842,862, dated Sep. 30, 2019, 15 pages.
Japanese Office Action (w/translation) issued in application 2018-159877, dated Jun. 13, 2019 (7 pgs).
International Search Report issued in application No. PCT/JP2013/084029, dated Mar. 25, 2014 (4 pgs).
International Preliminary Report on Patentability issued in application No. PCT/JP2013/084029, dated Nov. 5, 2015 (8 pgs).
International Search Report and Written Opinion issued in PCT/JP2014/050402, dated Feb. 10, 2014, with English translation, 12 pages.
International Preliminary Report on Patentability issued in PCT/JP2014/050402, dated Jul. 21, 2015, 4 pages.
International Search Report and Written Opinion issued in PCT/JP2019/045728, dated Dec. 17, 2019, with English translation, 13 pages.
International Preliminary Report on Patentability issued in PCT/JP2019/045728, dated May 25, 2021, 7 pages.
International Search Report and Written Opinion issued in PCT/JP2019/047890, dated Feb. 10, 2020, with English translation, 13 pages.
International Preliminary Report on Patentability issued in PCT/JP2019/047890, dated Aug. 10, 2021, 7 pages.
International Search Report and Written Opinion issued in PCT/JP2019/049870, dated Mar. 10, 2020, with English translation, 13 pages.
International Preliminary Report on Patentability issued in PCT/JP2019/049870, dated Jun. 16, 2021, 7 pages.
International Search Report and Written Opinion issued in PCT/JP2020/005260, dated Apr. 7, 2020, with English translation, 16 pages.
International Preliminary Report on Patentability issued in PCT/JP2020/005260, dated Aug. 10, 2021, 9 pages.
International Search Report and Written Opinion issued in PCT/JP2020/006421, dated Apr. 21, 2020, with English translation, 13 pages.
International Preliminary Report on Patentability issued in PCT/JP2020/006421, dated Aug. 10, 2021, 6 pages.
International Search Report and Written Opinion issued in PCT/JP2020/017170, dated Jun. 2, 2020, with English translation, 13 pages.
International Preliminary Report on Patentability issued in PCT/JP2020/027005, dated Feb. 1, 2022, 4 pages.
International Search Report and Written Opinion issued in PCT/JP2020/027005, dated Sep. 1, 2020, with English translation, 11 pages.
International Preliminary Report on Patentability issued in PCT/JP2019/032723, dated Mar. 2, 2021, 6 pages.

(56) References Cited

OTHER PUBLICATIONS

International Search Report and Written Opinion issued in PCT/JP2019/032723, dated Nov. 5, 2019, with English translation, 17 pages.
International Preliminary Report on Patentability issued in PCT/JP2019/029771, dated Feb. 2, 2021, 7 pages.
International Search Report and Written Opinion issued in PCT/JP2019/029771, dated Sep. 17, 2019, with English translation, 20 pages.
International Preliminary Report on Patentability issued in PCT/JP2019/040209, dated Apr. 27, 2021, 6 pages.
International Search Report and Written Opinion issued in PCT/JP2019/040209, dated Dec. 24, 2019, with English translation, 17 pages.
International Preliminary Report on Patentability issued in PCT/JP2019/038155, dated Mar. 23, 2021, 6 pages.
International Search Report and Written Opinion issued in PCT/JP2019/038155, dated Nov. 19, 2019, with English translation, 18 pages.
U.S. Appl. No. 17/257,260, filed Dec. 30, 2020, Okada.
U.S. Appl. No. 17/259,336, filed Jan. 11, 2021, Imura.
U.S. Appl. No. 17/275,505, filed Mar. 11, 2021, Tokunaga et al.
U.S. Appl. No. 17/277,282, filed Mar. 17, 2021, Tokunaga.
U.S. Appl. No. 17/296,466, filed May 24, 2021, Inoue et al.
U.S. Appl. No. 17/413,466, filed Jun. 11, 2021, Imura et al.
U.S. Appl. No. 17/420,660, filed Jul. 2, 2021, Suzuki et al.
U.S. Appl. No. 17/428,909, filed Aug. 5, 2021, Tokunaga et al.
U.S. Appl. No. 17/429,896, filed Aug. 10, 2021, Suzuki et al.

* cited by examiner

SLIDING COMPONENT

TECHNICAL FIELD

The present invention relates to a sliding component, for example, a mechanical seal, a bearing, and other sliding components in which a fluid is interposed between sliding surfaces.

BACKGROUND ART

The performance of a sliding component is often evaluated by a leakage amount and a wear amount. Conventionally, it is known that a fluid is interposed between sliding surfaces to reduce a friction coefficient. Due to the growing awareness of environmental issues in recent years, there is known one in which a dynamic pressure generation groove is provided on a sliding surface of a rotating seal ring of a mechanical seal. The sliding surfaces are slightly separated from each other by a positive dynamic pressure (hereinafter, simply referred to as a positive pressure or a dynamic pressure) generated in the dynamic pressure generation groove, a sealed fluid is guided between the sliding surfaces to form a fluid film between the sliding surfaces, and a friction coefficient is reduced.

Further, there is proposed one in which an opening of a dynamic pressure generation groove is disposed on a leakage side to achieve both sealing and lubrication while having low friction (for example, see Patent Citation 1). In the mechanical seal of Patent Citation 1, a plurality of spiral grooves are arranged at equal intervals in a circumferential direction on a sliding surface of a stationary seal ring such that an opening end is opened to a low pressure side and a closed end is disposed on a high pressure side and is closed. Since a fluid on the leakage side is sucked from the opening end of the spiral groove during the relative rotation of the stationary seal ring to generate a positive pressure at the closed end and in the vicinity thereof, a sealed fluid that is about to leak to the leakage side is recovered by allowing the sealed fluid to flow out between the sliding surfaces from the closed end and the vicinity thereof.

CITATION LIST

Patent Literature

Patent Citation 1: JP 6444492 B2 (Page 4, FIG. 2)

SUMMARY OF INVENTION

Technical Problem

However, since the spiral grooves of Patent Citation 1 are formed to have substantially the same width and are arranged at equal intervals in the circumferential direction of the sliding surface and the opening end of the spiral groove and the land between the adjacent spiral grooves are alternately arranged on the leakage side, there is a risk that the sealed fluid leaks to a space on the leakage side from the position of the land between the adjacent spiral grooves without entering the spiral grooves. As a result, the recovery rate of the sealed fluid was low.

The present invention has been made in view of such problems and an object thereof is to provide a sliding component having excellent lubricity and a high recovery rate of a sealed fluid.

Solution to Problem

In order to solve the foregoing problem, a sliding component according to the present invention is a sliding component including a pair of sliding members, one of the sliding members having a sliding surface provided with a plurality of dynamic pressure generation grooves extending from a leakage side to a sealed fluid side, wherein the sliding surface is provided with a recessed portion extending in a circumferential direction and opened to the leakage side, and wherein the recessed portion communicates with the dynamic pressure generation grooves. According to the aforesaid feature of the present invention, since the sealed fluid leaking to the leakage side on a land dividing the adjacent dynamic pressure generation grooves is guided to the recessed portion and the sealed fluid guided to the recessed portion is introduced to the dynamic pressure generation grooves, the lubricity is excellent, the recovery rate of the sealed fluid is high, and the leakage of the sealed fluid to the leakage side is prevented.

It may be preferable that a bottom surface of the recessed portion is formed to be equal in depth to a bottom surface of each of the dynamic pressure generation grooves at a boundary between the recessed portion and each of the dynamic pressure generation grooves. According to this preferable configuration, the sealed fluid inside the recessed portion is easily introduced into the dynamic pressure generation grooves.

It may be preferable that a bottom surface of the recessed portion is formed to be higher than a bottom surface of each of the dynamic pressure generation grooves at a boundary between the recessed portion and each of the dynamic pressure generation grooves. According to this preferable configuration, the sealed fluid does not easily flow reversely from the dynamic pressure generation grooves to the recessed portion and the sealed fluid does not easily leak.

It may be preferable that the recessed portion is formed by a plurality of arc-shaped recesses separately arranged in a circumferential direction, and each of the arc-shaped recesses is disposed so as to overlap, in a radially directional view, with a part of the dynamic pressure generation grooves communicating with adjacent one of the arc-shaped recesses. According to this preferable configuration, the sealed fluid flowing from the dynamic pressure generation grooves on the upstream side of the rotation direction to the leakage side can be efficiently recovered.

It may be preferable that the recessed portion is formed in an annular shape. According to this preferable configuration, since the recessed portion is formed over the entire circumference, the sealed fluid that is about to leak to the leakage side is easily guided into the recessed portion.

It may be preferable that the recessed portion is formed at an inner radial end of the sliding surface. According to this preferable configuration, the sealed fluid is easily guided into the recessed portion due to the centrifugal force generated by rotational sliding.

In addition, the fact that the recessed portion extending in the circumferential direction is formed on the sliding surface of one sliding member in the present invention means that the extension direction of the recessed portion has a larger component in the circumferential direction than in the radial direction. Further, the recessed portion may be opened to the leakage side wider than the groove width each of of the dynamic pressure generation grooves to be communicated.

DESCRIPTION OF EMBODIMENTS

Figure 1:
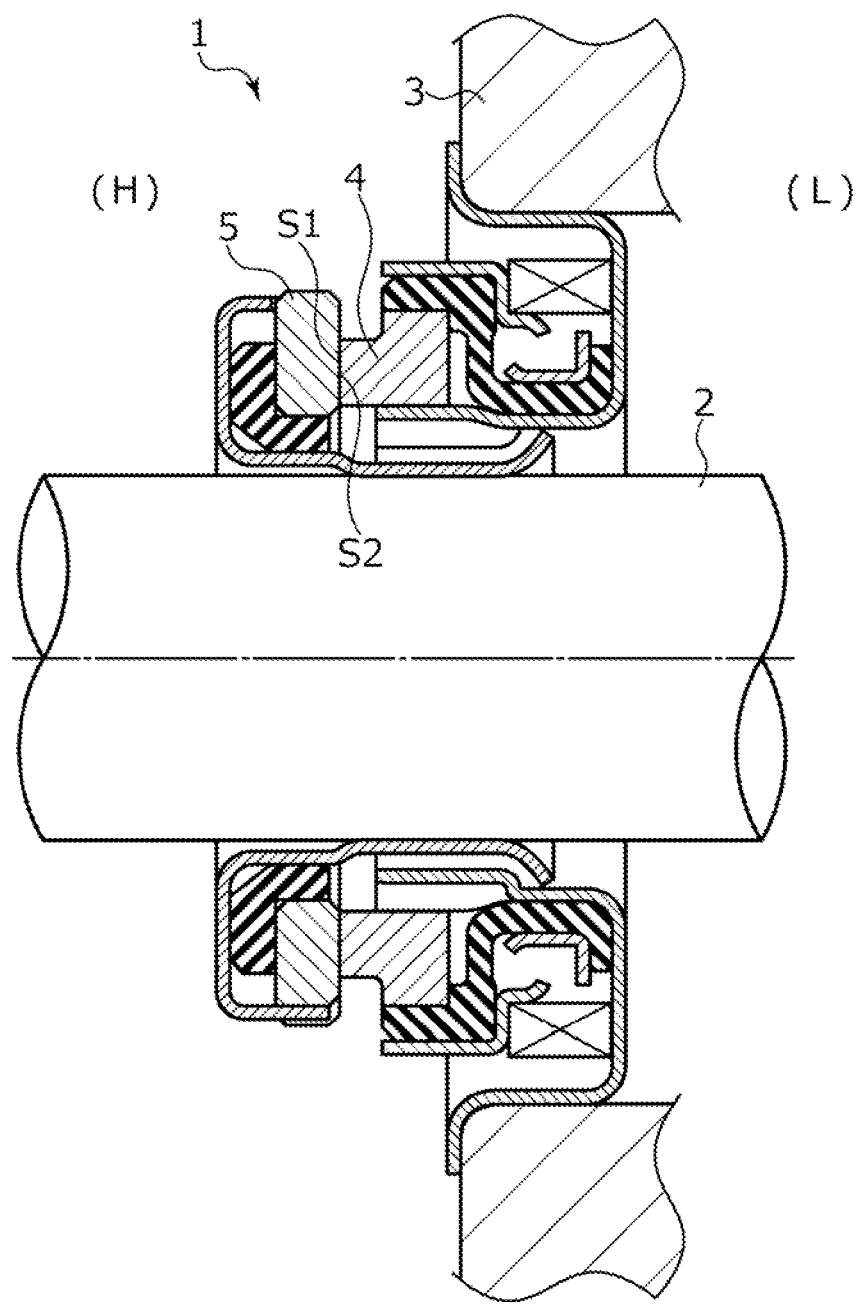
FIG. 1 is a cross-sectional view showing an example of a mechanical seal as a sliding component according to a first embodiment of the present invention.

Modes for carrying out a sliding component according to the present invention will be described based on embodiments.

First Embodiment

A sliding component according to a first embodiment of the present invention will be described with reference to FIGS. 1 to 4. A mode in which the sliding component is a mechanical seal will be described as an example. Further, a description will be made such that an outer radial side of the sliding component constituting the mechanical seal is a sealed liquid side (high pressure side) which is a sealed fluid side and an inner radial side is an atmosphere side (low pressure side) which is a leakage side. Further, for convenience of explanation, dots may be added to the bottom surface of the groove formed on the sliding surface in the drawings. Further, the shape of the groove shown in the drawings is different from the actual shape, and the depth direction is particularly emphasized.

As shown in FIG. 1, the sliding component of the first embodiment is an inside type mechanical seal 1 that is applied to a general industrial machine and seals a sealed fluid R which is about to leak from the outer radial side to the inner radial side of the sliding surface. The mechanical seal 1 is provided between a rotating shaft 2 of a rotating machine such as a pump or a compressor (not shown) and a seal cover 3 fixed to a housing of the rotating machine and includes a stationary side element including an annular stationary seal ring 4 fixed to the seal cover 3 and a rotary side element including an annular rotating seal ring 5 rotating together with the rotating shaft 2. The mechanical seal 1 allows a sliding surface S1 of the stationary seal ring 4 and a sliding surface S2 of the rotating seal ring 5 to slide closely with each other so that the sealed fluid R on the high pressure side (hereinafter, referred to as a high pressure side H) inside the machine is axially sealed and does not leak to the leakage side (hereinafter, referred to as a low pressure side L).

In addition, the sliding component is not limited to the mechanical seal, may be one in which a fluid is interposed between sliding surfaces, and may constitute a bearing or other machines.

The stationary seal ring 4 and the rotating seal ring 5 are typically formed of SiC (as an example of hard material) or a combination of SiC (as an example of hard material) and carbon (as an example of soft material), but the invention is not limited thereto. The sliding material which can be used as the sliding material for the mechanical seal can be applied. In addition, examples of SiC include materials composed of two or more types of phases having different components and compositions, for example, SiC in which graphite particles are dispersed, reaction sintered SiC composed of SiC and Si, SiC—TiC, SiC—TiN, and the like as well as sintered bodies using boron, aluminum, carbon, and the like as sintering aids and examples of the carbon include resin-molded carbon, sintered carbon, and the like as well as carbon which is a mixture of carbonaceous and graphite. In addition to the above-described sliding materials, metal materials, resin materials, surface modification materials (e.g., coating materials), composite materials, and the like can also be applied.

Figure 2:
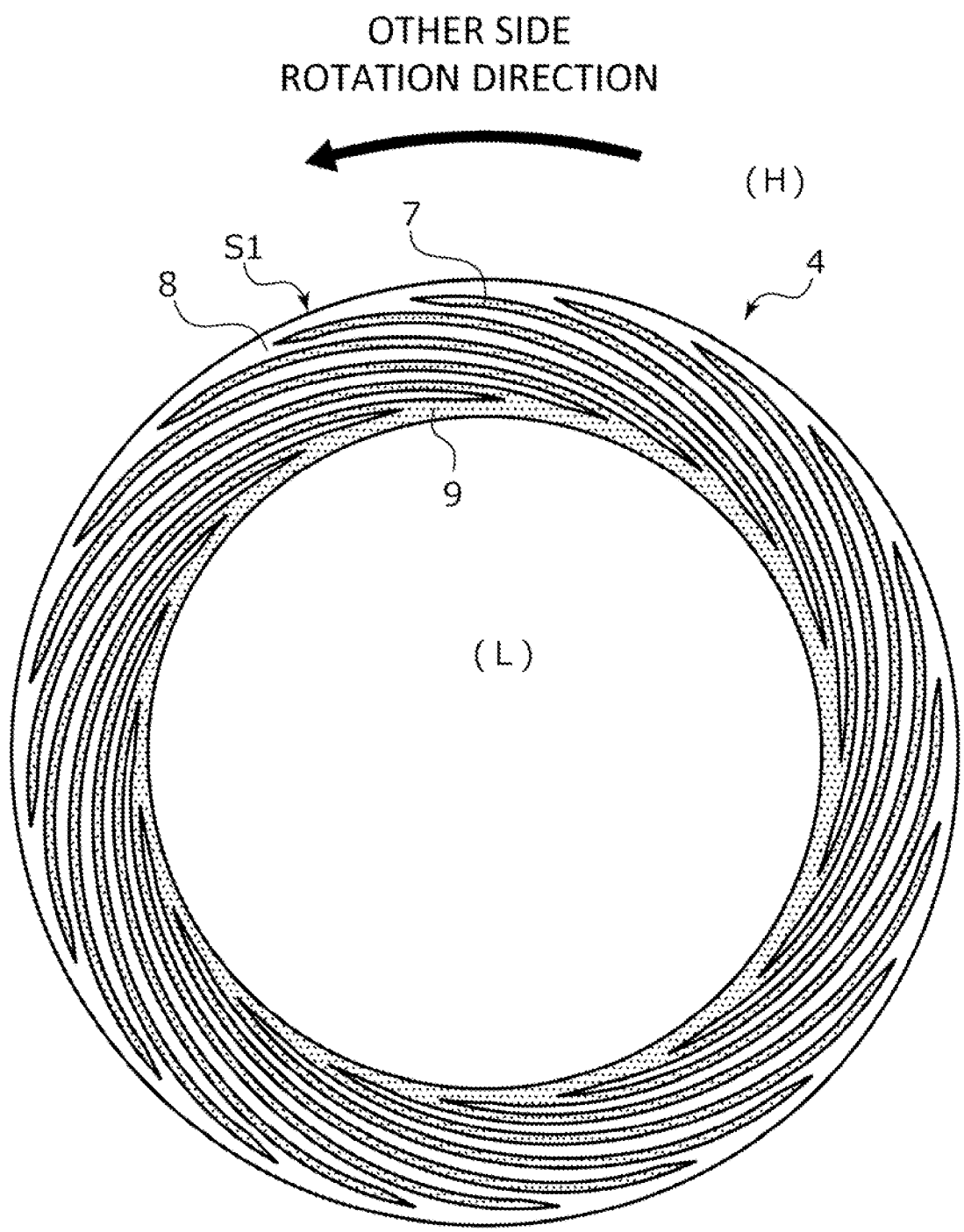
FIG. 2 is a front view showing a sliding surface of a stationary seal ring provided with an annular groove in the first embodiment.

As shown in FIGS. 1 and 2, the rotating shaft 2 is inserted through the annular stationary seal ring 4 and a plurality of spiral grooves 7 are formed on the sliding surface S1 by surface texturing or the like. In addition, the rotating seal ring 5 which is disposed to face the sliding surface S1 of the stationary seal ring 4 is provided to rotate in the counterclockwise rotation direction (i.e., the direction indicated by the arrow in the drawing) with respect to the stationary seal ring 4.

The sliding surface S1 of the stationary seal ring 4 is provided with the spiral grooves 7 which are formed at a plurality of positions (e.g., in the present embodiment, twenty positions) to be separated from each other at equal intervals along the circumferential direction as dynamic pressure generation grooves which extend while being curved from the inner radial side to the outer radial side and an annular groove 9 is formed as a recessed portion which is formed on the inner radial side in relation to the spiral grooves 7 in an annular shape. The annular groove 9 is formed at the inner radial end portion of the sliding surface S1 and is opened to the low pressure side L over 360°. In these spiral grooves 7, the inner radial side communicates with the annular groove 9 at a communication portion 7a and the outer radial side is closed at a terminated end portion 7e (see FIG. 3).

In addition, the sliding surface S2 of the rotating seal ring 5 of this embodiment is formed as a flat surface and the flat surface is not provided with the dynamic pressure generation groove and the like.

Figure 3:
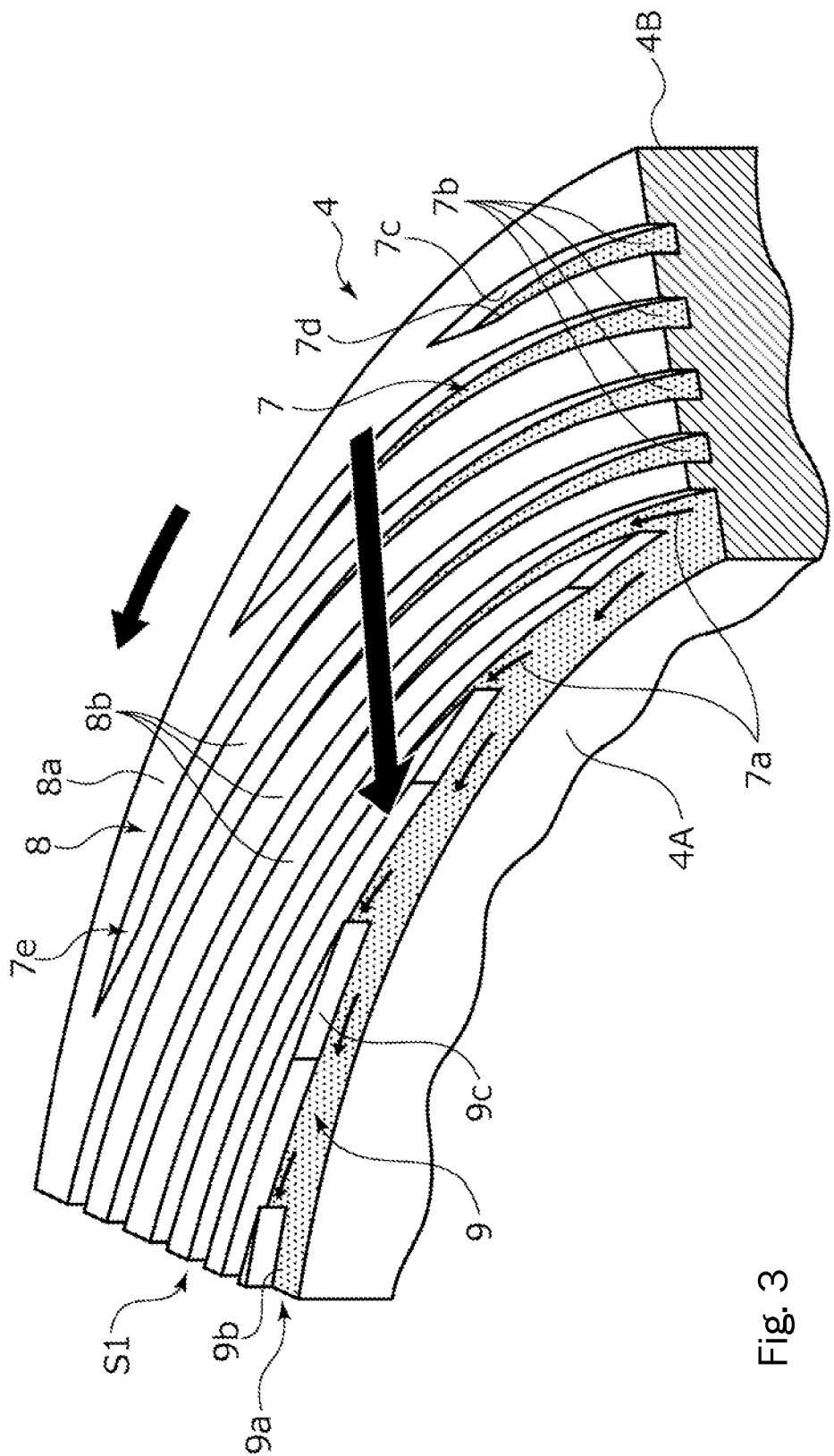
FIG. 3 is a partially enlarged schematic view showing a mode in which a fluid is introduced from the annular groove to dynamic pressure generation grooves in the first embodiment.

The sliding surface S1 of the stationary seal ring 4 will be described in detail with reference to FIG. 3. The remaining region of the sliding surface S1 excluding the spiral groove 7 and the annular groove 9 is formed as a flat land portion 8. Further, the annular groove 9 includes a bottom surface 9b which is parallel to the land portion 8 and a side surface 9c which is formed on the outer radial side and the bottom surface 9b and the side surface 9c are arranged to be orthogonal to each other. An opening portion 9a in which an inner surface 4A of the stationary seal ring 4 is notched is formed on the inner radial side of the annular groove 9.

The spiral groove 7 includes the communication portion 7a which communicates with the annular groove 9, the bottom surface 7b which is parallel to the land portion 8, an outer surface 7c and an inner surface 7d which are curved in an arc shape and face each other, and the terminated end portion 7e and the outer surface 7c and the inner surface 7d which are separated from each other at equal intervals and are curved gradually narrow as they extend to the outer radial side at the terminated end portion 7e continuous to them. From this, the positive pressure of the sealed fluid R flowing into the spiral groove 7 increases especially in the vicinity of the terminated end portion 7e, the sliding surface S1 of the stationary seal ring 4 and the sliding surface S2 of the rotating seal ring 5 are separated from each other, and a liquid film is formed between the sliding surfaces.

Further, the bottom surface 9b of the annular groove 9, the communication portion 7a corresponding to the boundary between the annular groove 9 and the spiral groove 7, and the bottom surface 7b of the spiral groove 7 are formed at the same depth and the sealed fluid R can easily flow from the annular groove 9 into the spiral groove 7.

The land portion 8 includes an inner land portion 8b which is formed between the adjacent spiral grooves 7 and an outer land portion 8a which is connected to the inner land portion 8b and is formed in an annular shape at the outer radial end portion of the sliding surface S1. The inner land portion 8b and the outer land portion 8a are formed at the substantially same height and a positive pressure is generated by the spiral groove 7 when the sliding surface S1 of the stationary seal ring 4 and the sliding surface S2 of the rotating seal ring 5 slide on each other, so that lubricity between the sliding surfaces S1 and S2 can be obtained.

Figure 4A:
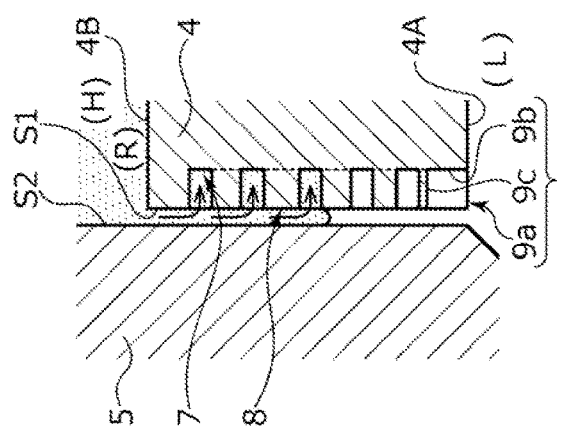
FIG. 4A shows a partially enlarged schematic view of a sliding surface of a stationary seal ring between sliding surfaces at the time of initial sliding in the first embodiment and FIG. 4B shows a partially enlarged schematic view of the sliding surface of the stationary seal ring between the sliding surfaces at the time elapsed from the initial sliding in the first embodiment.
Figure 4A:
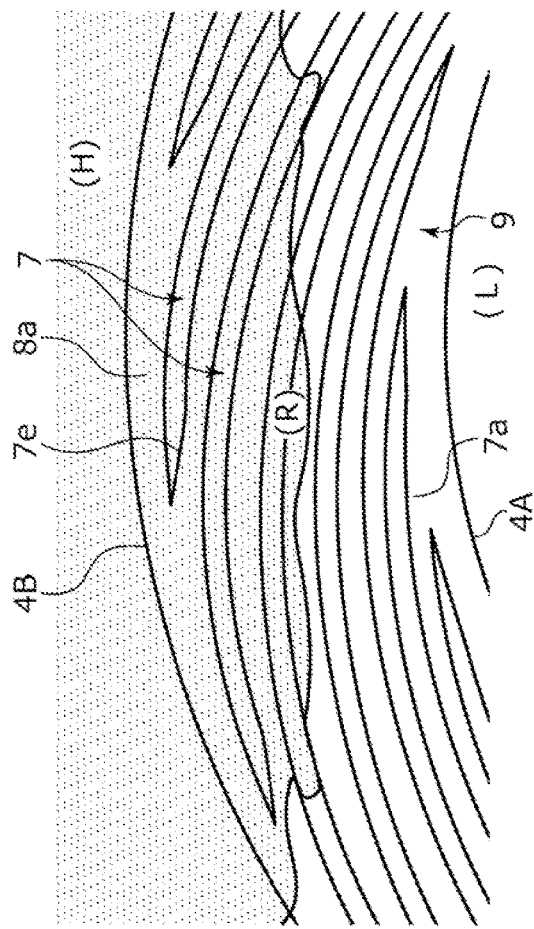

Next, the mode of the sealed fluid R when the stationary seal ring 4 and the rotating seal ring 5 slide on each other will be schematically described with reference to FIGS. 4A and 4B. In the initial stage of sliding, the sliding surface S1 and the sliding surface S2 are in contact with each other and the fluid (atmosphere, etc.) on the low pressure side L is introduced into the plurality of spiral grooves 7 of the stationary seal ring 4 by sliding, so that a slight positive pressure is generated between the sliding surfaces. From this, as shown in FIG. 4A, a slight gap is formed between the sliding surface S1 and the sliding surface S2 and the sealed fluid R on the high pressure side H flows between the sliding surfaces due to a pressure difference. The sealed fluid R passes through the outer land portion 8a of the land portion 8 and gradually moves to the inner radial side between the inner land portion 8b of the sliding surface S1 of the stationary seal ring 4 and the rotating seal ring 5 and a part of the sealed fluid R flows into the spiral groove 7.

At this time, a part of the sealed fluid R flowing to the spiral groove 7 flows toward the terminated end portion 7e due to the rotation of the rotating seal ring 5 and is supplied between the sliding surfaces as the positive pressure increases and the spiral groove 7 is filled with the sealed fluid R as the lubricity between the sliding surfaces increases.

Figure 4B:
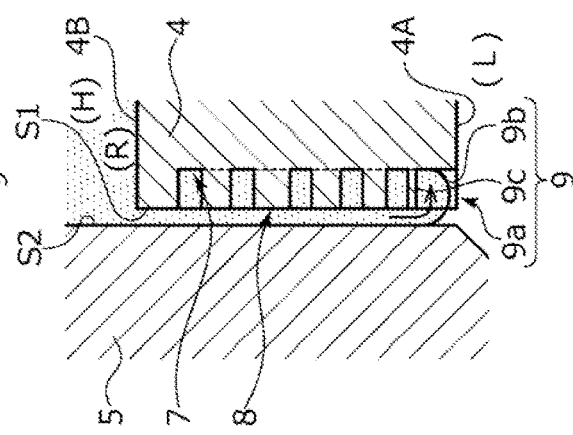
Figure 4B:
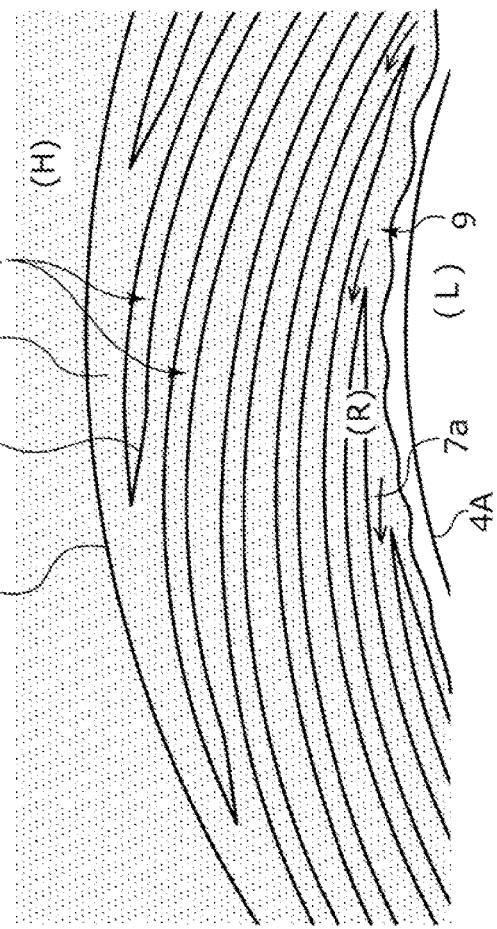

Next, as shown in FIG. 4B, the sealed fluid R reaches the annular groove 9 on the inner radial side of the spiral groove 7. That is, the sealed fluid R between the sliding surfaces is actively guided from the gap between the sliding surface S1 and the sliding surface S2 slightly separated from each other in the axial direction into the annular groove 9 by the gap formed between the bottom surface 9b of the annular groove 9 and the sliding surface S2 to be wider than the gap between the sliding surfaces. At this time, in this embodiment, since the annular groove 9 is provided with the opening portion 9a opened to the inner radial side, the sealed fluid R inside the annular groove 9 is guided toward the side surface 9c on the outer radial side due to a negative pressure to be described later or a centrifugal force generated by the sliding between the rotating seal ring 5 and the stationary seal ring 4. Accordingly, the sealed fluid R does not easily leak from the annular groove 9 to the low pressure side L and is easily recovered to the spiral groove 7 communicating with the outer radial side of the annular groove 9.

Further, since a positive pressure is generated in the vicinity of the terminated end portion 7e of the spiral groove 7 as described above, a negative pressure is generated in the communication portion 7a communicating with the spiral groove 7 and the sealed fluid R flowing through the annular groove 9 is introduced toward the communication portion 7a. The introduced sealed fluid R sequentially flows toward the terminated end portion 7e.

As described above, since the annular groove 9 including the opening portion 9a opened to the inner radial side is formed on the side of the inner surface 4A in relation to the spiral groove 7 of the stationary seal ring 4, the sealed fluid R interposed between the sliding surfaces and particularly the sealed fluid R not introduced into the spiral groove 7 can be guided into the annular groove 9 on the innermost radial side. That is, conventionally, the sealed fluid R leaking to the low pressure side L (the leakage side) can be introduced into the spiral groove 7 through the annular groove 9. For this, the outflow of the sealed fluid R to the low pressure side L is reduced and the recovery rate of the sealed fluid R that is about to leak can be improved.

In this way, in the mechanical seal 1 in which the sliding surface S1 of the stationary seal ring 4 serving as any one sliding component of the mechanical seal 1 serving as the pair of sliding components is provided with the spiral grooves 7 serving as the plurality of dynamic pressure generation grooves extending from the low pressure side L to the high pressure side H, the sliding surface S1 is provided with the annular groove 9 serving as the recessed portion extending in the circumferential direction and opened to the low pressure side L and the annular groove 9 communicates with the spiral groove 7. Accordingly, since the sealed fluid R leaking to the low pressure side L on the land portion 8 dividing the adjacent spiral grooves 7 is guided to the annular groove 9 and the sealed fluid R guided to the annular groove 9 is introduced into the spiral groove 7, the lubricity is excellent, the recovery rate of the sealed fluid R is high, and the leakage to the low pressure side L is prevented.

Further, since the bottom surface 9b of the annular groove 9 is formed in the communication portion 7a as the boundary between the annular groove 9 and the spiral groove 7 to have the same depth as the bottom surface 7b of the spiral groove 7, the sealed fluid R inside the annular groove 9 is easily introduced into the spiral groove 7.

Further, since the annular groove 9 is formed in an annular shape so that the annular groove 9 is formed over the entire circumference of one sliding surface S1, the sealed fluid R that is about to leak to the low pressure side L is easily guided into the annular groove 9.

Further, since the annular groove 9 is formed at the inner radial end portion of one sliding surface S1, the sealed fluid R is easily guided into the annular groove 9 due to the centrifugal force generated by sliding.

Next, a modified example of the sliding component according to the present invention will be described with reference to FIG. 5. In addition, the same components as those shown in the first embodiment are designated by the same reference numerals, and duplicate description will be omitted.

Figure 5:
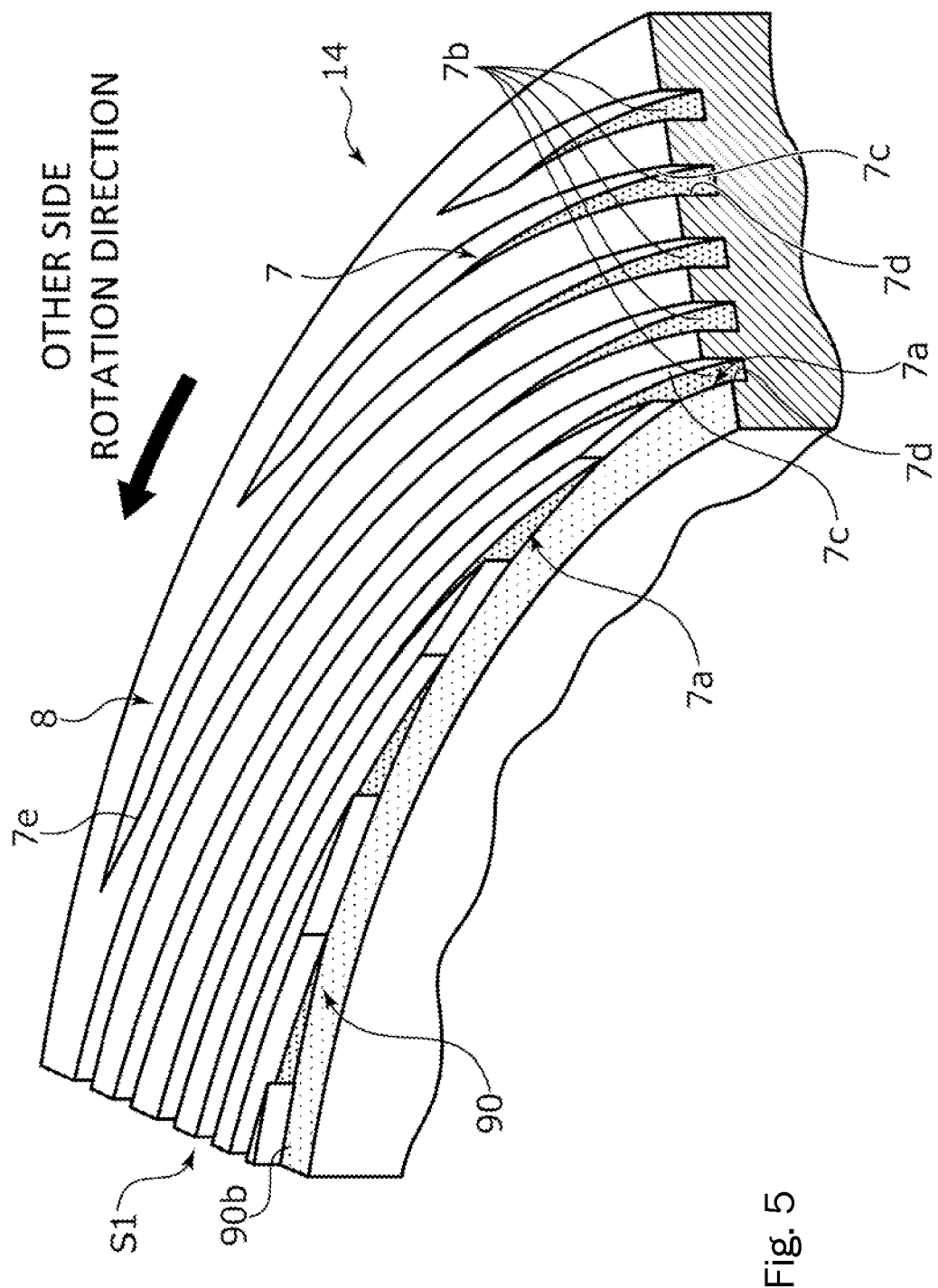
FIG. 5 is a partially enlarged perspective view showing a modified example of the annular groove in the first embodiment.

As shown in FIG. 5, a stationary seal ring 14 of a second embodiment includes an annular groove 90 provided with a bottom surface 90b which is thinner than the bottom surface 9b of the annular groove 9 described in the first embodiment. That is, the bottom surface 90b of the annular groove 90 is formed to be higher than the bottom surface 7b of the spiral groove 7. Further, the annular groove 90 is formed at the inner radial end portion of the sliding surface S1 and is opened to the low pressure side L over 360°. Similarly to the first embodiment, all spiral grooves 7 communicate with the annular groove 90 and the communication portion 7a is provided with a part of the inner surface 7d which hangs down substantially vertically from the bottom surface 90b of the annular groove 90.

Further, the bottom surface 90b of the annular groove 90 is formed at the same depth over the entire circumference.

In this way, since the bottom surface 90b of the annular groove 90 is formed to be higher than the bottom surface 7b of the spiral groove 7, the sealed fluid R does not easily flow reversely from the spiral groove 7 to the annular groove 90 and the sealed fluid R does not easily leak to the low pressure side L.

Second Embodiment

Next, a second embodiment according to the sliding component of the present invention will be described with reference to FIG. 6. In addition, the same components as those shown in the above-described embodiment are designated by the same reference numerals, and duplicate description will be omitted.

Figure 6:
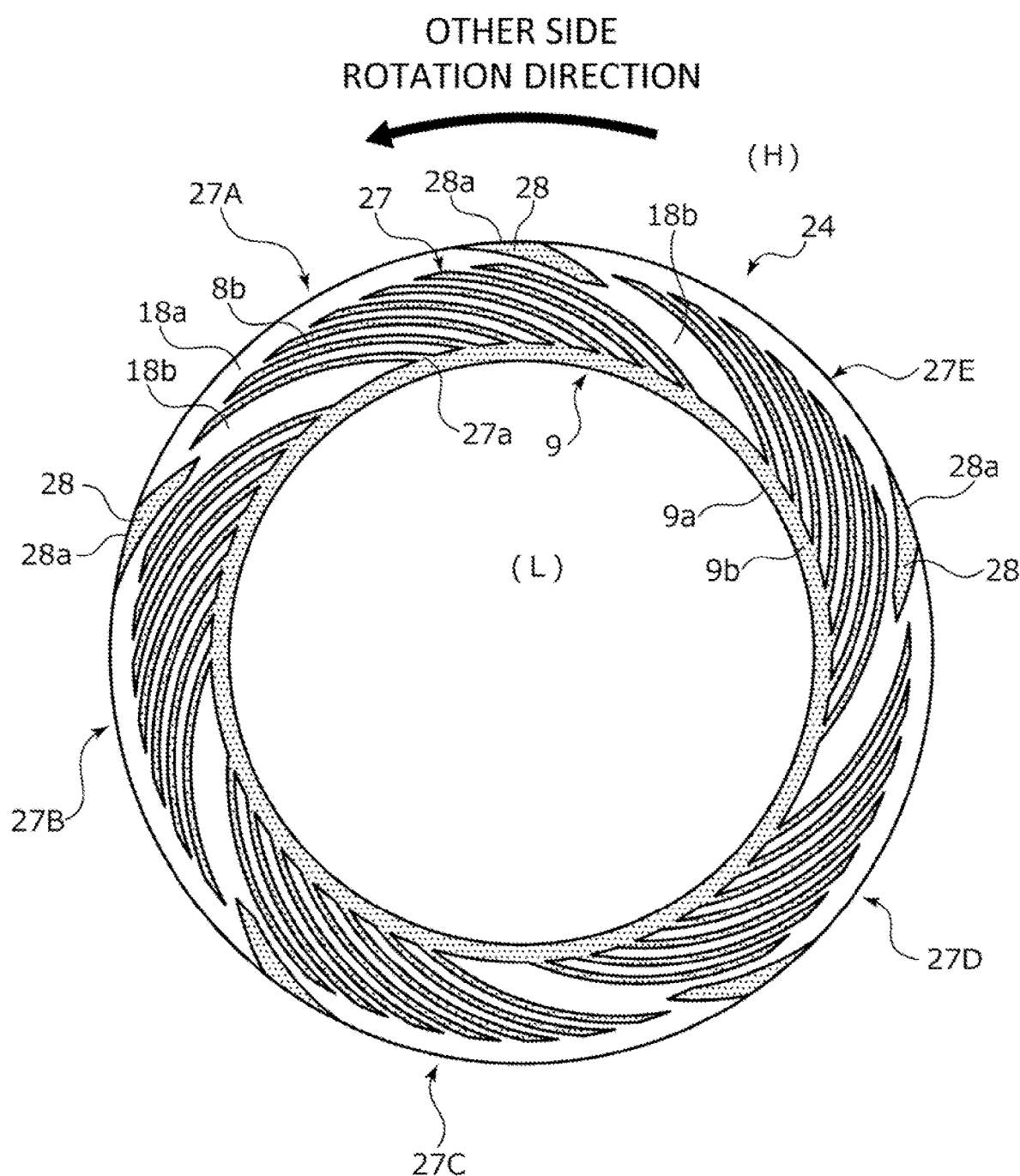
FIG. 6 is a front view showing a sliding surface of a stationary seal ring of a sliding component according to a second embodiment of the present invention.

As shown in FIG. 6, in a stationary seal ring 24 of the second embodiment, a plurality of (e.g., seven in this embodiment) spiral grooves 27 are grouped in a bundle and spiral groove groups 27A to 27E as one group are provided in a plurality of groups (e.g., five groups in this embodiment) at equal intervals in the circumferential direction. A wide land portion 18b which is formed to have a wider width in the circumferential direction than the inner land portion 8b formed between the adjacent spiral grooves 27 is formed at five positions at equal intervals in the circumferential direction between the spiral groove groups 27A to 27E which are adjacent to each other in the circumferential direction. Further, a negative pressure generation groove 28 is formed on the outer radial side of each wide land portion 18b to be curved and drilled from the outer radial end portion of the stationary seal ring 24 to the inner radial side.

Thus, the outer land portion 18a is separated in the circumferential direction due to the formation of the negative pressure generation groove 28 and is disposed at five equal positions at the outer radial end portion. That is, in the sliding surface of the stationary seal ring 24, the outer land portion 18a, the inner land portion 8b, and the wide land portion 18b are formed to be connected to each other at the same height in the remaining region excluding the spiral groove groups 27A to 27E, the annular groove 9, and the negative pressure generation groove 28.

An outer radial end portion 28a of the negative pressure generation groove 28 is opened to the high pressure side H and the sealed fluid R on the high pressure side H is introduced during sliding to generate a negative pressure between the sliding surfaces. Further, in the second embodiment, the bottom surfaces of the annular groove 9, the spiral groove 27, and the negative pressure generation groove 28 have the same depth.

When the stationary seal ring 24 of the second embodiment slides on the rotating seal ring 5 including the sliding surface S2 provided with the flat surface, a positive pressure is generated by the spiral groove groups 27A to 27E and a negative pressure is generated by the negative pressure generation groove 28 between the sliding surfaces. Accordingly, there is an effect of improving the sealing performance by suppressing the separation width between the sliding surfaces due to the negative pressure while maintaining the lubrication between the sliding surfaces due to the positive pressure.

Third Embodiment

Next, a sliding component according to a third embodiment of the present invention will be described with reference to FIG. 7. In addition, the same components as those shown in the above-described embodiment are designated by the same reference numerals, and duplicate description will be omitted.

Figure 7:
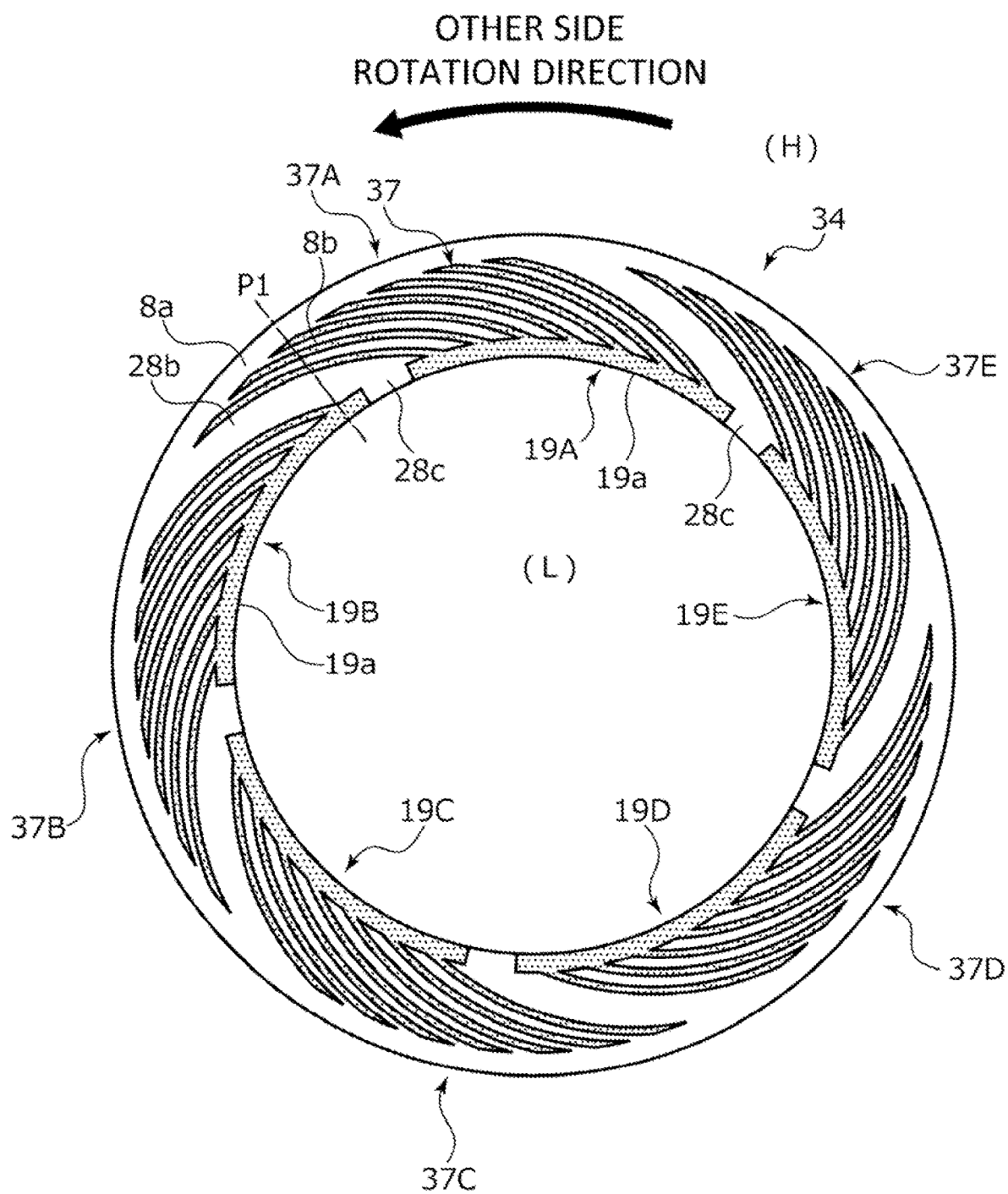
FIG. 7 is a front view showing a sliding surface of a stationary seal ring of a sliding component according to a third embodiment of the present invention.

As shown in FIG. 7, in a stationary seal ring 34 of the third embodiment, arc grooves 19A to 19E are independently separated from each other at predetermined intervals in the circumferential direction unlike the annular groove 9 formed in an annular shape in the first and second embodiments. Then, in the third embodiment, the arc grooves 19A to 19E are arranged at equal intervals on the innermost radial side of the stationary seal ring 34 and include an opening portion 19a opened to the low pressure side L.

Each of the arc grooves 19A to 19E communicates with a spiral groove 37 which is curved and extends in the circumferential direction. In the third embodiment, a plurality of (e.g., seven in this embodiment) spiral grooves 37 extend from one arc groove in a direction from the inner radial side to the outer radial side and a plurality of (e.g., five in this embodiment) spiral groove groups 37A to 37E are formed at equal intervals in the circumferential direction. Further, the arc grooves 19A to 19E and the spiral groove groups 37A to 37E are formed to have the same depth.

A wide land portion 28b which is formed to have a wider width in the circumferential direction than the inner land portion 8b formed between the adjacent spiral grooves 27 is formed at five positions at equal intervals in the circumferential direction between the spiral groove groups 37A to 37E which are adjacent to each other in the circumferential direction. Further, an inner end land portion 28c which is connected to the inner radial end portion of the wide land portion 28b is formed between the arc grooves 19A to 19E which are adjacent to each other in the circumferential direction and the arc grooves 19A to 19E are separated from each other in the circumferential direction. That is, in the sliding surface of the stationary seal ring 34, the outer land portion 8a, the inner land portion 8b, the wide land portion 28b, and the inner end land portion 28c are formed to be connected to each other at the same height in the remaining region excluding the spiral groove groups 37A to 37E and the arc grooves 19A to 19E.

Further, a description will be made with reference to, for example, a virtual line P1 extending in the radial direction of FIG. 7. The arc groove 19B communicating with the spiral groove group 37B is disposed to radially overlap the plurality of spiral groove groups 37A provided to extend and communicate with the upstream arc groove 19A adjacent to the arc groove 19B.

From this, since the arc groove 19B is disposed to radially overlap the spiral groove group 37A extending from the adjacent arc groove 19A, the sealed fluid R flowing to the low pressure side L over the wide land portion 28b from the spiral groove 37A extending from the upstream arc groove 19A in the rotation direction can be efficiently recovered to the downstream arc groove 19B.

Fourth Embodiment

Next, a sliding component according to a fourth embodiment of the present invention will be described with reference to FIG. 8. In addition, the same components as those shown in the above-described embodiment are designated by the same reference numerals, and duplicate description will be omitted.

In the fourth embodiment, the inner radial side of the sliding component will be described as the sealed fluid side (i.e., the high pressure side H), the outer radial side will be described as the leakage side (i.e., the low pressure side L), and a stationary seal ring 44 capable of sealing the sealed fluid R that is about to leak from the inner radial side to the outer radial side at the sliding portion between the rotating seal ring and the stationary seal ring will be described.

Figure 8:
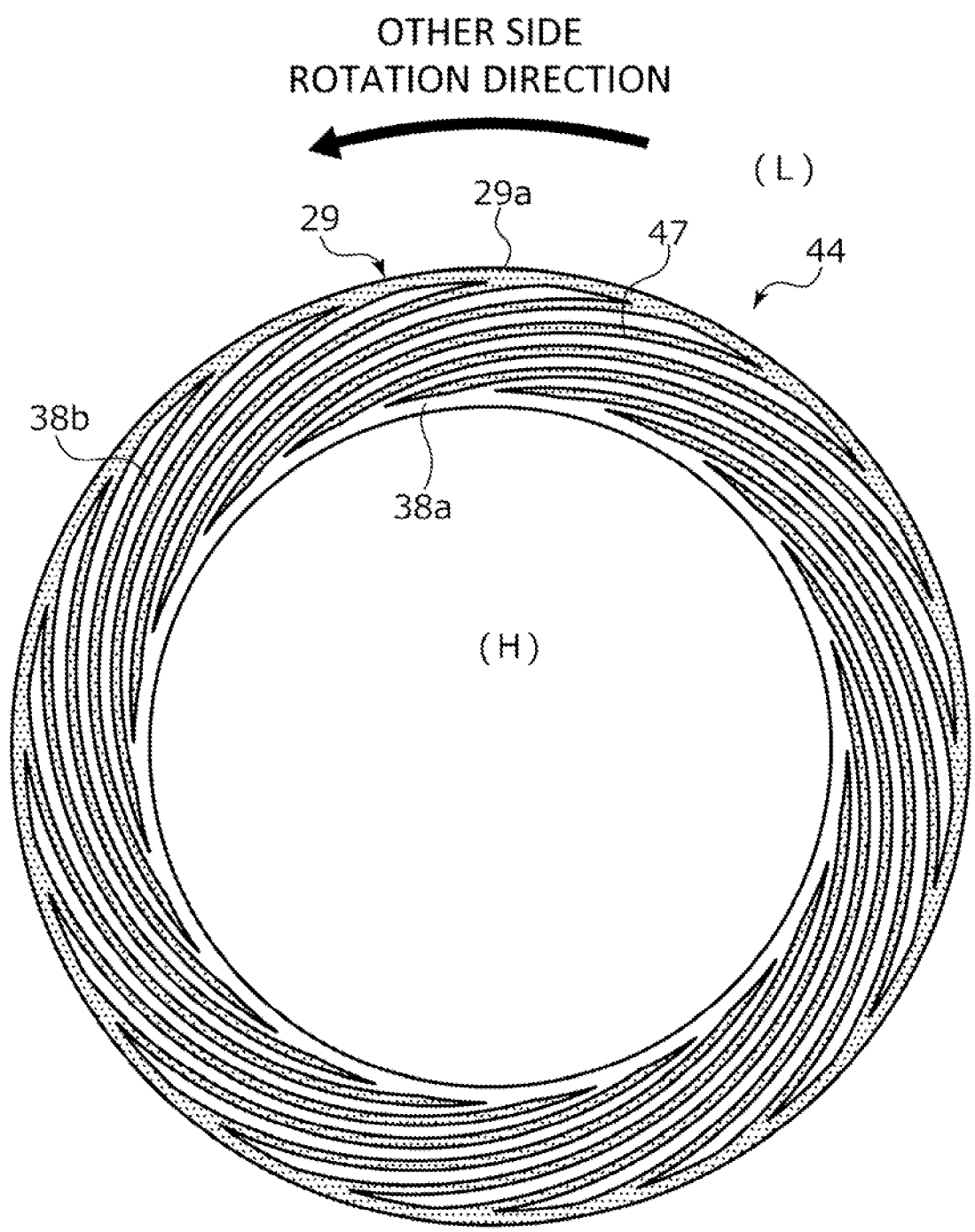
FIG. 8 is a front view showing a sliding surface of a stationary seal ring of a sliding component according to a fourth embodiment of the present invention.

As shown in FIG. 8, the sliding surface of the stationary seal ring 44 of the fourth embodiment is provided with a spiral groove 47 which is formed at a plurality of positions (e.g., twenty positions in this embodiment) in the circumferential direction to extend while being curved from the outer radial side to the inner radial side and an annular groove 29 is formed in an annular shape on the outer radial side of the spiral groove 47. The annular groove 29 is formed at the outer radial end portion and is provided with an opening portion 29a opened to the low pressure side L over 360°. In these spiral grooves 47, the outer radial side communicates with the annular groove 29 and the inner radial side is closed. Additionally, the annular groove 29 and the spiral groove 47 are formed to have the same depth.

In a remaining region excluding the spiral groove 47 and the annular groove 29, an inner land portion 38b formed between the adjacent spiral grooves 47 and an inner annular land portion 38a formed in an annular shape at the inner peripheral end portion are formed to be connected to each other at the same height.

With the above-described configuration of the fourth embodiment, since the sliding surface of the stationary seal ring 44 is provided with the annular groove 29 which extends in the circumferential direction and is opened to the low pressure side L and the annular groove 29 communicates with the spiral groove 47, the sealed fluid R leaking to the low pressure side L on the land portion 38 dividing the spiral groove 47 is guided to the annular groove 29 and the sealed fluid R guided to the annular groove 29 is introduced to the spiral groove 47. Accordingly, the lubricity is excellent, the recovery rate of the sealed fluid R is high, and the leakage to the low pressure side L is prevented.

Fifth Embodiment

Next, a sliding component according to a fifth embodiment of the present invention will be described with reference to FIG. 9. In addition, the same components as those shown in the above-described embodiment are designated by the same reference numerals, and duplicate description will be omitted. In the fifth embodiment, a stationary seal ring 54 slides relative to a rotating seal ring (not shown) that rotates in both directions in the circumferential direction.

Figure 9:
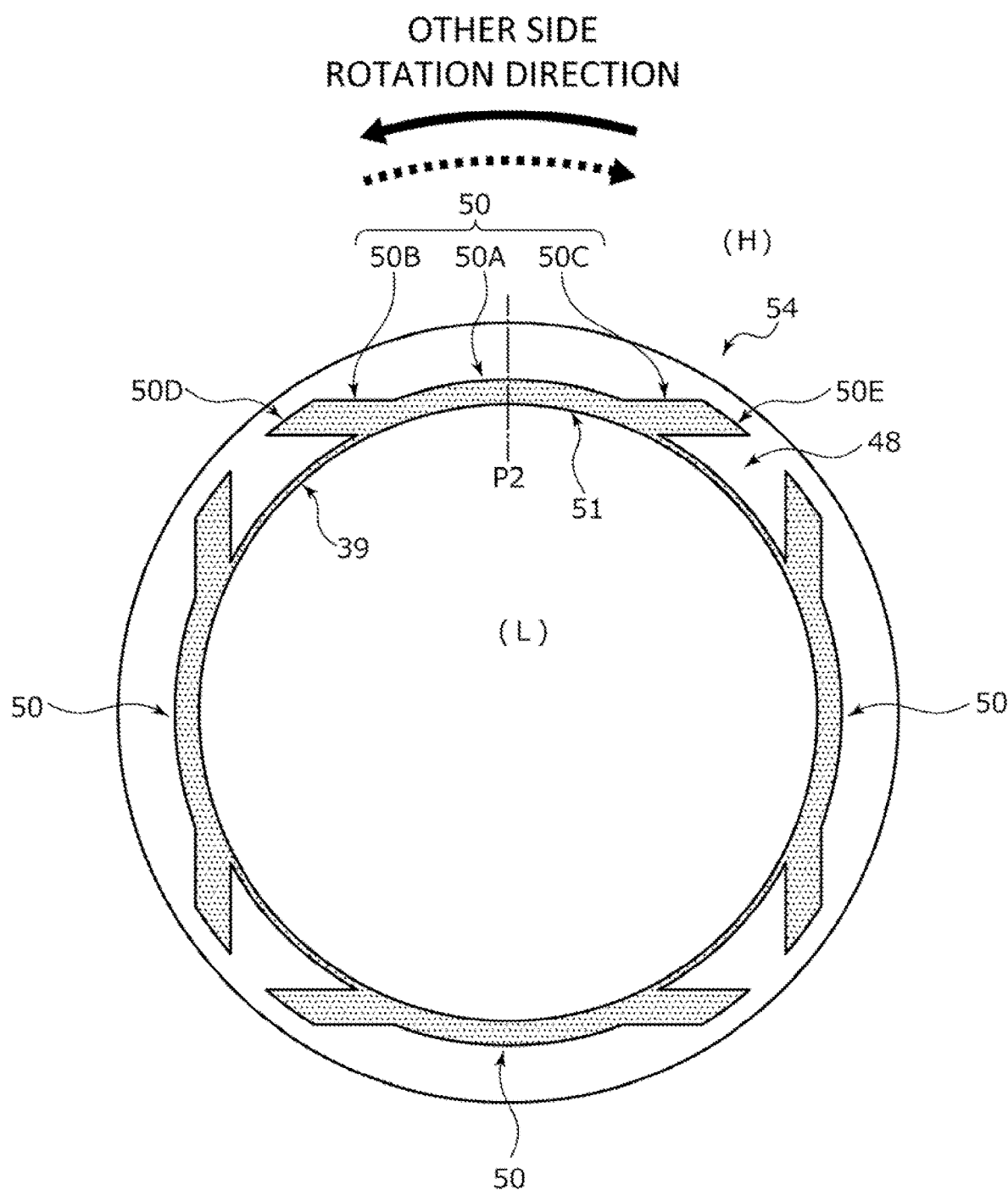
FIG. 9 is a front view showing a sliding surface of a stationary seal ring of a sliding component according to a fifth embodiment of the present invention.

As shown in FIG. 9, the sliding surface of the stationary seal ring 54 of the fifth embodiment is provided with an annular groove 39 which is formed at the inner radial end portion and is opened to the low pressure side L over 360° and a plurality of groove portions 50 which communicate with the annular groove 39 and are separated from each other in the circumferential direction. Each groove portion 50 includes a center groove 50A which includes an opening portion 51 communicating with the annular groove 39 and extends in the circumferential direction, a first side groove 50B which obliquely extends in a linear shape in the radial direction from one end portion of the center groove 50A in the circumferential direction, and a second side groove 50C which obliquely extends in a linear shape in the radial direction from the other end portion of the center groove 50A in the circumferential direction. Further, the annular groove 39 and the groove portion 50 are formed to have the same depth.

In the first side groove 50B, a terminated end portion 50D thereof is formed at an acute angle in the circumferential direction. Similarly, in the second side groove 50C, a terminated end portion 50E thereof is formed at an acute angle in the circumferential direction. That is, the groove portion 50 is formed line-symmetrically with reference to a virtual line P2 extending in the radial direction through the center in the circumferential direction of the center groove 50A. Further, a remaining region excluding the annular groove 39 and the groove portion 50 is formed as a flat land portion 48 and is formed to be connected at the same height.

In FIG. 9, when the rotating seal ring (not shown) rotates in the counter-clockwise rotation direction of the drawing paper with respect to the stationary seal ring 54, for example, as indicated by a solid arrow, the sealed fluid R on the low pressure side L inside the groove portion 50 is converged toward the terminated end portion 50D of the first side groove 50B and flows out between the sliding surfaces.

On the other hand, when the rotating seal ring (not shown) rotates in the clockwise rotation direction of the drawing paper with respect to the stationary seal ring 54 as indicated by a dotted arrow in FIG. 9, the sealed fluid R on the low pressure side L inside the groove portion 50 is converged toward the terminated end portion 50E of the second side groove 50C and flows out between the sliding surfaces.

The sealed fluid R passing through the land portion 48 between the sliding surfaces to the inner radial side is guided to the annular groove 39 formed at the inner radial end portion and is introduced into the groove portion 50.

In this way, since the groove portion 50 is formed line-symmetrically with respect to the virtual line P2, the groove portion can be used not only in the relative rotation direction between the stationary seal ring 54 and the rotating seal ring 5. Further, since the annular groove 39 is formed, the recovery rate of the sealed fluid R is high.

Although the embodiments of the present invention have been described above with reference to the drawings, the detailed configuration is not limited to the first to fifth embodiments and the modified example and modifications or additions in the scope not departing from the spirit of the present invention are also included in the present invention.

For example, in the second to fifth embodiments, a case has been described in which the annular groove and the arc groove serving as the arc-shaped recesses and the spiral groove and the groove portion serving as the dynamic pressure generation grooves are formed at the same depth, but the present invention is not limited thereto. For example, the recessed portion and the dynamic pressure generation groove may be formed at different depths as shown in the modified example of the first embodiment.

Further, a case has been described in which the bottom surface 9b of the annular groove 9 and the bottom surface 7b of the spiral groove 7 are parallel to the land portion 8, but the present invention is not limited thereto. For example, these bottom surfaces may be arranged to be inclined to the inner radial side or the outer radial side.

Further, the radial width of the annular groove 9 may not be equal over the entire circumference.

Further, the annular groove 9 is formed at the inner radial end portion of the stationary seal ring 4, but the annular groove may be also provided in the vicinity of the center portion in addition to the inner radial end portion as a double annular groove on the sliding surface.

Further, in the above-described embodiment, a case has been described in which the annular groove 9 and the spiral groove 7 are formed in the stationary seal ring 4, but the present invention is not limited thereto. For example, the annular groove and the spiral groove may be provided in the rotating seal ring and the sliding surface of the stationary seal ring may be a flat surface.

REFERENCE SIGNS LIST

1 Mechanical seal (sliding component)
2 Rotating shaft
3 Seal cover
4 Stationary seal ring (sliding member)
5 Rotating seal ring (sliding member)
7 Spiral groove (dynamic pressure generation groove)
7a Communication portion
8 Land portion
8a Outer land portion
8b Inner land portion
9 Annular groove (recessed portion)
9a Opening portion
14 Stationary seal ring (sliding member)
19A to 19E Arc groove (arc-shaped recess)
24 Stationary seal ring (sliding member)
27 Spiral groove (dynamic pressure generation groove)
27A to 27E Spiral groove group
28 Negative pressure generation groove
29 Annular groove (recessed portion)
34 Stationary seal ring (sliding member)
37 Spiral groove (dynamic pressure generation groove)
37A to 37E Spiral groove group
39 Annular groove (recessed portion)
44 Stationary seal ring (sliding member)
47 Spiral groove (dynamic pressure generation groove)
50 Groove portion (dynamic pressure generation groove)
54 Stationary seal ring (sliding member)
90 Annular groove (recessed portion)

The invention claimed is:

1. A sliding component comprising a pair of sliding members, one of the sliding members having a sliding surface provided with a plurality of dynamic pressure generation grooves extending from a leakage side to a sealed fluid side,
   wherein the sliding surface is provided with a recessed portion extending in a circumferential direction and opened to the leakage side,
   wherein the recessed portion communicates with the dynamic pressure generation grooves,
   wherein a bottom surface of the recessed portion is formed to be equal in depth to or higher than a bottom surface of each of the dynamic pressure generation grooves at a boundary between the recessed portion and each of the dynamic pressure generation grooves,
   wherein the recessed portion has a circumferential width larger than circumferential lengths of the dynamic pressure generation grooves, and
   wherein each of the dynamic pressure generation grooves radially overlap with a groove portion of the recessed portion which is protruded in the circumferential direction from each of the dynamic pressure generation grooves.

2. The sliding component according to claim 1, wherein the recessed portion is formed in an annular shape.

3. The sliding component according to claim 1, wherein the recessed portion is formed at an inner radial end of the sliding surface.

4. The sliding component according to claim 2, wherein the recessed portion is formed at an inner radial end of the sliding surface.

* * * * *